Aug. 4, 1953      R. L. SINK      2,648,008
MASS SPECTROMETER
Filed July 11, 1949
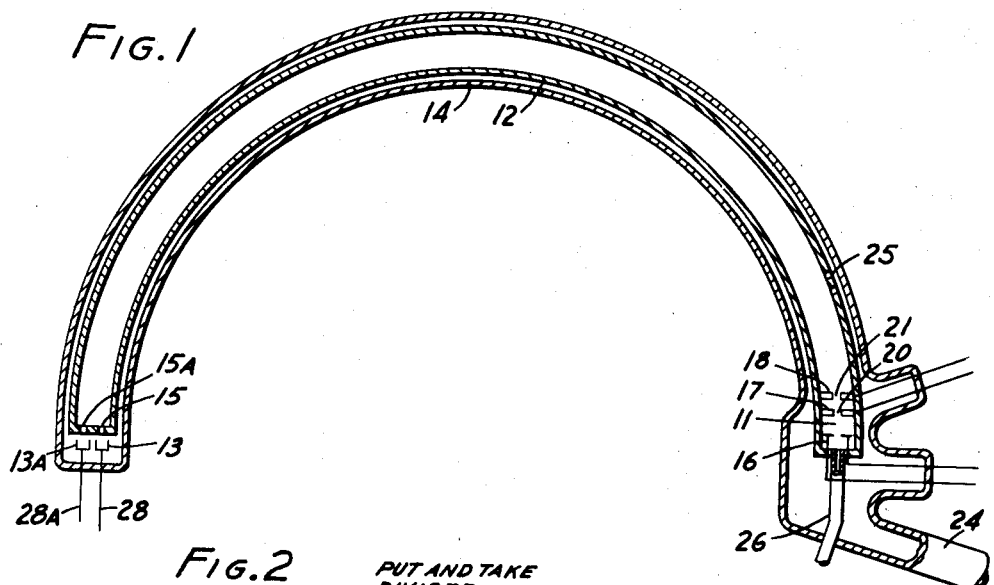
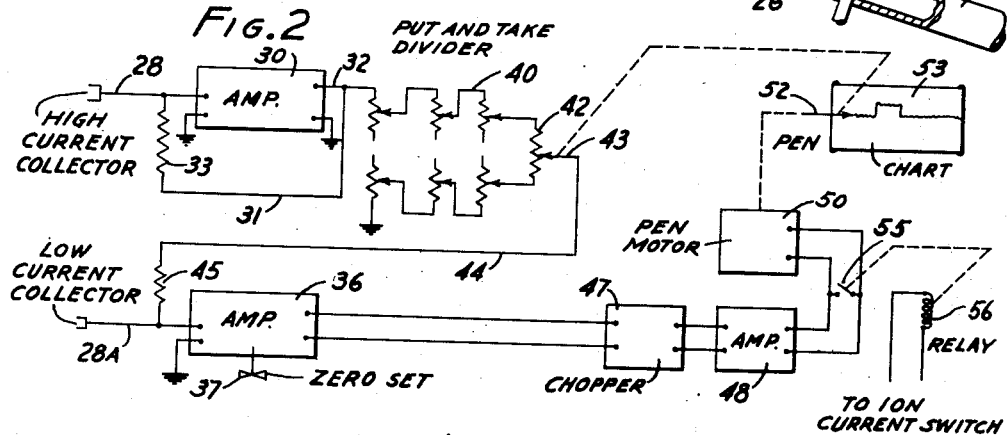
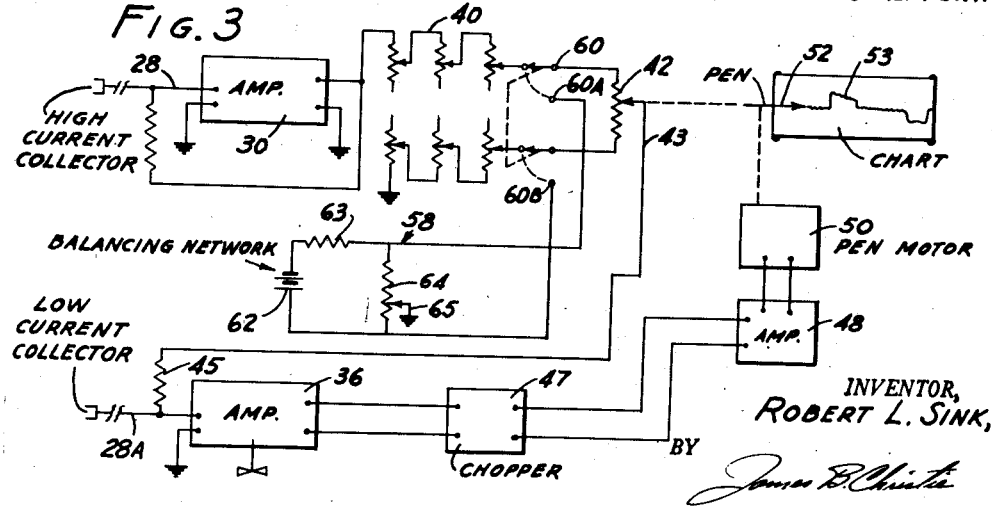
INVENTOR,
ROBERT L. SINK,
ATTORNEY.

Patented Aug. 4, 1953

2,648,008

UNITED STATES PATENT OFFICE 2,648,008

MASS SPECTROMETER

Robert L. Sink, Altadena, Calif., assignor to Consolidated Engineering Corporation, Pasadena, Calif., a corporation of California Application July 11, 1949, Serial No. 104,030

4 Claims. (Cl. 250—41.9)

This invention relates to mass spectrometry and particularly to improvements in mass spectrometers for use in measuring the relative abundance of components in samples of materials.

A mass spectrometer is an analytical apparatus which sorts ions. Ordinarily it includes an ion source in which molecules of the sample under investigation are bombarded by a stream of electrons and are thereby converted into ions. The ions, thus formed, are propelled by so-called propelling or accelerating electrodes into and through an analyzer chamber. During passage through the analyzer chamber, the heterogeneous beam of ions is subjected to a magnetic or electrical field or both to separate the ions according to their mass-to-charge ratios into a plurality of homogeneous diverging ion beams. Each beam is composed of ions of the same specific mass which differs from the specific mass of the ions forming the other beams. The diverging beams may be successively focused on an ion collector by variation in the potential applied to the accelerating electrodes. The current produced by the discharge of an ion beam at the collector is indicative of the amount of ions in the beam. This discharge current is thus a measure of the partial pressure of the parent molecule in the sample admitted to the ion source.

Recently mass spectrometers have been adapted to measurement of isotope rations by inclusion of a pair of collector electrodes. One of said electrodes is referred to as the low current electrode and at this electrode the ion beam derived from molecules of a low abundance isotope is discharged. The other electrode is referred to as the high current electrode and the ion beam or beams of the more abundant isotope or isotopes are focussed on and discharged at this electrode. For example, consider the analysis of a sample of carbon dioxide, to determine the relative abundance of the $C^{13}$ and $C^{12}$ isotopes. $C^{12}$ being the most abundant, the $CO_2{}^{44}$ ions will be focussed on the high current collector and the $CO_2{}^{45}$ ions will be focussed on the low current collector.

In isotope ratio analysis it is generally desired to measlure the ratio of the ion-current rather than the absolute value of each of the components. Accordingly, the amplification and recording circuit connected to the two collector electrodes is frequently arranged as a null balance network wherein the current developed at one collector is effectively divided by the other to give a recorded value representative of the indicated ratio.

A collector circuit of this character is illustrated and described in some detail in U. S. Patent 2,456,426 issued to Alfred O. C. Nier on December 14, 1948. The Nier circuit includes a separate amplifier connected to each of the high and low current collectors. The output of the low current amplifier (this being the amplifier connected to the low current collector), is fed into a voltmeter while the output of the high current amplifier (this being the amplifier connected to the high current collector), is connected to a potentiometer. The tap of the potentiometer is connected through a suitable resistance to the input of the low current amplifier. In operation the tap of the potentiometer is adjusted to feed a signal into the low current amplifier which will balance the output of the low current collector and produce a null reading of the voltmeter receiving the output of the low current amplifier. The high current amplifier is a feed back type circuit and has a gain of 1. In this fashion the setting of the potentiometer is a measure of the desired ratio. Refinements in the circuit may include interposition of a "put and take" divider between the high current amplifier and the potentiometer and a recorder to record the variations from balance position. The put and take divider provides a simple means of obtaining the decimal relationship between the voltage across the whole divider and the voltage across a portion of the divider.

The present invention is directed to improvements in the circuit defined in the above mentioned U. S. patent wherein the operation of the circuit is automatic, the balanced condition being arrived at quickly and automatically in successive analysis once the circuit is adjusted, as with a put and take divider, so that the recorder will be operated within its limiting range.

In accordance with one embodiment, the invention contemplates in a mass spectrometer comprising two collector electrodes, a first amplifier connected to one of said electrodes, a second amplifier connected to the other of said electrodes, and recording means, the improvement comprising a potentiometer connected across the first amplifier, means connecting the tap of said potentiometer to the input of said second amplifier, a servo-system connected to said second amplifier and operative responsive to the output thereof to adjust the tap of said potentiometer to the point where there is no output from said second amplifier, and means for recording the excursions of the potentiometer tap. As above described, a signal is fed from the high current amplifier through the potentiometer, to the input of the low current amplifier intended to balance a current fed to the low current amplifier from the low current collector. When there is any change in the relative abundance of the ions striking the high and low current collectors the balance in the system will be disturbed so that a signal appears at the output of the low current amplifier. In the Nier circuit this signal is evidenced on a voltmeter and the potentiometer is accordingly manually balanced to return the voltmeter to a null position. In the circuit of the present invention, this signal is applied through a suitable network hereinafter more fully described, to a servomotor which is mechanically coupled to the tap of the potentiometer to adjust the same to a position where the signal applied to the input of the low current amplifier just balances the signal obtained from the low current collector so that there is no amplifier output across the servomotor. By mechanically connecting the pen or other marking means of the recording apparatus to the tap of the potentiometer or to the servomotor, excursions of the potentiometer tap are recorded on the chart. The chart may be calibrated to give a direct reading of the last few significant figures of the ratio of ions discharged at the low current collector to the ions discharged at the high current collector. The initial figures of the ratio are determined from the put-take divider setting.

The invention will be more clearly understood with reference to the following detailed description thereof taken in conjunction with the accompanying drawing in which:

Fig. 1 is a diagrammatic illustration of one type of mass spectrometer;

Fig. 2 is a diagram of a collector circuit in accordance with the invention; and Fig. 3 is a diagram of an alternative type of collector circuit in accordance with the invention.

The conventional 180° magnetic analyzer mass spectrometer shown diagrammatically in Fig. 1 has an ion source 11, an analyzer tube 12, and a pair of ion collectors 13, 13A all disposed within an envelope 14. Analyzer tube 12 is provided at the end adjacent the ion collectors 13, 13A with so-called collector or exit slits 15, 15A, respectively through which the ion beams are focussed on the collectors. An electron gun 16 is mounted in the ion source and ions formed by the electron beam emanating from the gun are propelled by accelerating electrodes 17, 18 into the analyzer tube. Accelerating electrodes 17, 18 are provided respectively with a first slit 20 and a second slit 21. The ions enter the space between electrodes 17, 18 through slit 20 and are propelled by an accelerating electric field established between the electrodes through slit 21 into the analyzer tube.

This spectrometer is provided with an envelope exhaust line 24 which may be connected to a mercury diffusion pump, molecular pump or any appropriate evacuating system (not shown). The analyzer tube 12 may be provided with ports 25 by means of which the ion source and the analyzer tube are evacuated through the envelope. Alternatively, the envelope may be omitted by making the analyzer tube 12 gas tight and attaching the pumps to it by means which are well known.

An inlet line 26 provides means for introducing the sample to be analyzed either continuously or intermittently into the ion source. The ions propelled from the source are formed in the analyzer tube into diverging beams of ions, each beam being composed of ions of a given specific mass.

The ion separation taking place in the analyzer tube is brought about by means of an electrical or magnetic field established across the tube. Means for obtaining such a transverse field are well known and form no part of the present invention. The diverging ion beams are focussed on the ion collectors 13, 13A through the exit slits 15, 15A by adjusting the potential applied to the accelerating electrodes 17, 18. The ion collectors 13, 13A are connected to an amplification and recording system by leads 28, 28A sealed through the envelope 14.

The mass spectrometer illustrated in Fig. 1 is only one of many conventional types. The invention is directed to improvements in mass spectrometers of any type in which it is desired to measure the relative abundance of components, say isotopes, in a sample. In accordance with the invention the leads 28, 28A, connected to the collectors 13, 13A, are connected to a so-called collector and recording circuit of the type shown in Figs. 2 or 3. Assuming that collector 13 to be the high current collector, i. e. the collector upon which the isotopes of relatively greater abundance are focussed and collector 13A to be the low current collector, i. e. the collector in which the isotopes of relatively smaller abundance are focussed, collector 13 is connected through lead 28 to a feedback type D. C. amplifier 30. The feedback system of amplifier 30 is shown diagrammatically only and includes lead 31 connecting output lead 32 with the input lead 28 through a grid resistor 33. Low current collector 13A is connected by lead 28A to a D. C. amplifier 36 provided with a zero set adjustment 37. The output of the high current amplifier 30 is fed through lead 32 to a put and take divider network 40 the last portion of which is connected across a potentiometer 42 having an adjustable tap 43. The tap 43 is connected by lead 44 through a grid resistor 45 to the input lead 28A of amplifier 36. The output of amplifier 36 is connected to a chopper 47 wherein the D. C. output of the amplifier is converted to an A. C. signal which is fed into an amplifier 48. Chopper 47 may be any of the conventional instruments designed to convert D. C. current to an A. C. component. The output of amplifier 48 is applied to a servomotor 50 which is mechanically connected to tap 43 of potentiometer 42 and to a pen 52 forming the marking means of a recorder 53.

The method of obtaining an isotope ratio with the described apparatus is as follows. The sample to be analyzed is introduced into the ionization chamber 16 of the mass spectrometer shown in Fig. 1. Ions formed in the ionization chamber are propelled through the analyzer tube 12 as described above by accelerating electrodes 20, 21 and are focussed by a magnetic or electrical field through exit slits 15, 15A onto a collector electrode 13, 13A. The arrangement is such that the relatively more abundant isotopes are focussed on the collector 13 whereas the relatively less abundant isotopes are focussed on collector 13A. In the example previously given, this means that if $CO_2$ is admitted to the ion source 11, $CO_2^{44}$ is focussed on collector 13 whereas $CO_2^{45}$ is focussed on collector 13A. The current developed at collectors 13, 13A by the discharge of the ion beams thereon is fed respectively to amplifiers 30, 36.

Before the ion current is turned on, i. e. before the current is being delivered from the collector electrodes to the amplifiers, amplifier 36 is adjusted for zero output by means of zero set control 37. This zero condition is determined by the rate of movement of the pen on chart 53. If the pen is not progressing either up-scale or down-scale, then the zero of this pre-amplifier has been properly adjusted. In the circuit as illustrated it should be pointed out, that zero unbalance results in the pen moving at a constant rate regardless of position. This is so since there is nothing within the system to balance the output of the amplifier as the pen moves. Consider the effect of an unbalance in amplifier 36 when there is no signal from either collector electrode. The unbalance voltage is applied through chopper 47, amplifier 48 to pen motor 50 which causes the pen 52 to travel at a uniform rate of speed transversely to the chart. At the same time tap 43 of potentiometer 42 is uniformly changed. However, since no balancing signal is being delivered from amplifier 30 through the potentiometer to the input of amplifier 36 the pen will continue to move at the constant rate until the amplifier 36 has been properly balanced by the zero set 37.

With amplifier 36 balanced, the ion current is turned on. The circuit is no longer rate adjusted as in zero adjustment, but automatically adjusts itself to indicate the correct isotope ratio. The stages of divider 40 are adjusted to maintain the pen on the chart of recorder 53. The divider actually gives the first, second and third digits of the desired ratio. The fourth, fifth and sixth digits are then read from the scribed line on the chart. Consider the effect of current flow from collectors 13, 13A into amplifiers 30, 36 respectively. The current flowing through amplifier 36 disturbs the balance therein and operates the pen motor as described. The signal applied to amplifier 36 from collector 13 is applied to the put and take divider network without amplification since the amplifier 30 is a feedback amplifier having a unity gain. After the magnitude of the output signal from amplifier 30 is adjusted in the put-take divider as described above the residual signal is applied across the coil of potentiometer 42. A portion of this signal is tapped off by tap 43 and applied through grid resistor 45 to the input of amplifier 36. When the signal tapped off potentiometer 42 and applied to the input of amplifier 36 exactly balances the signal from the low current collector 13A, the output of amplifier 36 will be at a zero level. There will be no signal applied through chopper 47 and amplifier 48 to the pen motor and pen 52 will scribe a straight line on the chart 53. When there is a net signal applied to amplifier 36, i. e. the signal from potentiometer 42 does not balance the signal from collector 13A, the output of amplifier 36 will be applied as above described to pen motor 50 which when energized will adjust tap 43 of the potentiometer until such time as the signal applied from tap 43 balances the signal applied from collector 13A. When the circuit is balanced with the ion current turned on, the ion current is turned off and a check is made as to whether or not a zero drift has taken place in the interim. A zero drift will generally show up as a change in isotope ratio with time. Calculation can be made back to the time when it is known that the zero has been properly adjusted to obtain the exact isotope ratio.

A refinement in the circuit includes a switch 55 connected across the input leads of the servomotor 50. The switch is actuated by a relay 56 which is momentarily energized when the ion current switch, referred to above, is turned off and on. In this manner the servomotor is shorted during switching transients and hence is insensitive thereto.

The rate type zero balance of the circuit described above is more sensitive than the more conventional position type adjustment to which the majority of operators are more accustomed. It may be desirable to adjust the zero set by means of position adjustment rather than rate adjustment. This can be accomplished in the circuit as shown in Fig. 3. The circuit of Fig. 3 in most respects is similar to that of Fig. 2 including amplifiers 30, 36 connected to leads 28, 28A put-take divider 40 connected to the output of amplifier 30, a potentiometer 42 connected across the output of the divider 40 and having an adjustable tap 43 connected through a grid resistor 45 to the input of amplifier 36, a chopper 47, amplifier 48 and pen motor 50 connected across the output of amplifier 36 and a recording chart 53 having a pen 52 mechanically linked to the motor 50 and adjustable tap 43 of potentiometer 42. The circuit of Fig. 3 differs from that of Fig. 2 in the inclusion of an auxiliary balancing network 58 which may be connected across potentiometer 42 in place of the amplifier and put-take divider by means of switch 60. The balancing network 58 includes a source of D. C. voltage 62 connected across terminals 60A, 60B of switch 60 through a series resistor 63, a resistor 64 connected across the voltage source 62 and ground 65 grounding the voltage between terminals 60A and 60B of switch 60.

The balancing network in essence makes the low current collector amplifier 36 and associated chopper, amplifier and pen motor a completely self-balancing servo-system with a full scale sensitivity equivalent to the voltage between terminals 60A and 60B. By grounding the balancing network voltage intermediate tap 60A, 60B a zero adjustment may take place in any arbitrary position on the recorded chart independent of the zero line on the chart. The operation of the circuit of Fig. 3 is similar to that of Fig. 2 except that to balance the amplifier 36 switch 60 is positioned to connect potentiometer 42 across the balancing network 58. In this position of switch 60 the signal applied from the potentiometer into the input of amplifier 36 is obtained from the balancing network so that a positive voltage signal is applied from potentiometer 42 into amplifier 36 during zero adjustment. The voltage applied from the balancing network through potentiometer 42 into amplifier 36 with the ion current turned off is adjusted by means of pen motor 50 linked to the tap 43 of the potentiometer to the point where there is no net output signal from amplifier 36. The steady state position of the tap 43 of the potentiometer and accordingly the pen 52 will indicate balance of the amplifier 36.

The particular arrangement shown in Fig. 3 permits use of the section of the circuit including the balancing network 58, amplifier 36 and the associated servo-system as an electrometer amplifier useful for general adjustment purposes of a mass spectrometer.

The present invention thus relates to improvements in the amplification and recording circuit used in an isotope ratio mass spectrometer. These improvements are directed to automatic response of the circuit to give a direct reading of the ratio between one isotope and one or more other isotopes of the same element. Many modifications in this circuit with respect to types of amplification feedback circuit etc. may occur to those skilled in the art without departing from the present invention as described and claimed.

I claim:

1. In a mass spectrometer comprising two collector electrodes, a first amplifier connected to one of said electrodes, a second amplifier connected to the other of said electrodes, a potentiometer connected between the first amplifier and ground, the tap of the potentiometer being connected between the said other of said electrodes and the second amplifier, and a recorder, the improvement comprising a double pole, double throw switch connected between the first amplifier and potentiometer with the potentiometer connected across the movable contacts of the switch and the first amplifier connected across one pair of stationary contacts of the switch, a balancing network connected to the other pair of fixed contacts of said switch, the arrangement being such that the potentiometer can be connected alternately to the first amplifier and to the balancing network by means of the switch, a servo-system operative responsive to the output of the second amplifier to adjust the position of the said tap of the potentiometer, and means connecting said tap of said potentiometer and the marking means of said recorder, so that the recorder records the excursions of said tap of said potentiometer.

2. Apparatus according to claim 1 wherein the balancing network comprises a voltage source, a first resistor connected in series with the source, a second resistor connected across the source, and a ground grounding the second resistor.

3. In a mass spectrometer comprising two collector electrodes, a first amplifier connected to one of said electrodes, a second amplifier connected to the other of said electrodes, a potentiometer connected between the first amplifier and ground, the tap of the potentiometer being connected between the said other of said electrodes and the second amplifier, and a recorder, the improvement comprising a put-take divider connected between the first amplifier and the potentiometer, a double pole, double throw switch connected between the put-take divider and the potentiometer with the potentiometer connected across the movable contacts and the divider connected across one pair of fixed contacts of the switch, a balancing network connected to the other pair of fixed contacts of said switch and comprising a voltage source, a grounded resistor connected across said voltage source and a series resistor, the arrangement being such that the potentiometer may be connected alternately to said divider and said balancing network by means of the switch, a servo-system operative responsive to the output of the second amplifier to adjust the position of the said tap of the potentiometer, and means connecting said tap of said potentiometer and the marking means of said recorder, so that the recorder records the excursions of said tap of said potentiometer.

4. In a mass spectrometer for determining the ratio of two ion masses and having two electrodes respectively for collecting ions of the two masses, a first amplifier having its input connected to the first of the electrodes and a second amplifier having its input connected to the second of the electrodes, the combination which comprises a multistage adjustable potential divider connected across the output of the first amplifier, a potentiometer connected across the output of the divider and having a movable tap connected between the second electrode and the second amplifier for introducing into the input of the second amplifier a signal opposing that received by the second amplifier from the second electrode, a third amplifier connected to the output of the second amplifier, a motor electrically connected to the output of the third amplifier and mechanically connected to the tap of the potentiometer to drive the tap to a position at which the signal introduced into the input of the second amplifier equals and opposes that received by the second amplifier from the second electrode and a recorder connected in the system for recording the movement of the tap of the potentiometer.

ROBERT L. SINK.

References Cited in the file of this patent

UNITED STATES PATENTS

| Number | Name | Date |
|---|---|---|
| 2,300,742 | Harrison et al. | Nov. 3, 1942 |
| 2,454,520 | Moore | Nov. 23, 1948 |
| 2,456,426 | Nier et al. | Dec. 14, 1948 |